J. N. MAHONEY.
ELECTRIC RAILWAY BRAKE.
APPLICATION FILED APR. 20, 1908.

979,868.

Patented Dec. 27, 1910.
2 SHEETS—SHEET 2.

WITNESSES
Wm. M. Cady
J. C. Custer

INVENTOR
Joseph N. Mahoney
by E. H. Wright Att'y.

UNITED STATES PATENT OFFICE.

JOSEPH N. MAHONEY, OF WILKINSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

ELECTRIC RAILWAY-BRAKE.

979,868.   Specification of Letters Patent.   Patented Dec. 27, 1910.

Application filed April 20, 1908. Serial No. 428,163.

*To all whom it may concern:*

Be it known that I, JOSEPH N. MAHONEY, a citizen of the United States, residing at Wilkinsburg, in the county of Allegheny and State of Pennsylvania, have invented new and useful Improvements in Electric Railway-Brakes, of which the following is a specification.

This invention relates to railway brakes, and more particularly to an electric brake equipment wherein the propelling electric motors for the vehicle are adapted to be connected up to act as generators for supplying current to operate an electro-magnetic brake.

With one form of electro-magnetic brake heretofore employed, a magnetic brake shoe is suspended over the rail and upon causing a current to flow through the magnet coil of the brake shoe, the shoe is attracted to the rail and effects both a direct braking action by its drag on the rail and an indirect braking action by connecting up the brake shoe so as to apply wheel brakes, thus utilizing the magnetic attraction between the brake shoe of the magnetic brake and the rail or other friction engaging surface with the rail to bring the shoe into frictional engagement. At times the clearance space or air gap normally existing between shoe and rail is increased by reason of wear of brake shoe and failure to properly adjust the same, so that a heavier current is required to initially bring the shoe to the rail than is necessary to produce the desired gradual braking action. The motorman, finding the brake does not take hold in the first braking position, very often shifts the controller so as to cut out a large part or all of the brake circuit resistances. The consequence is that when the shoe finally snaps to the rail, a very heavy braking force is produced, and a smooth graduated stop is prevented.

The principal object of my invention is to provide an improved braking apparatus and circuit connections for producing a momentary and initial rush of current through the brake magnets and thereby effect the rapid movement of the brake shoe to its friction engaging surface preliminary to braking, so that thereafter the braking force may be graduated as desired.

Figure 1:
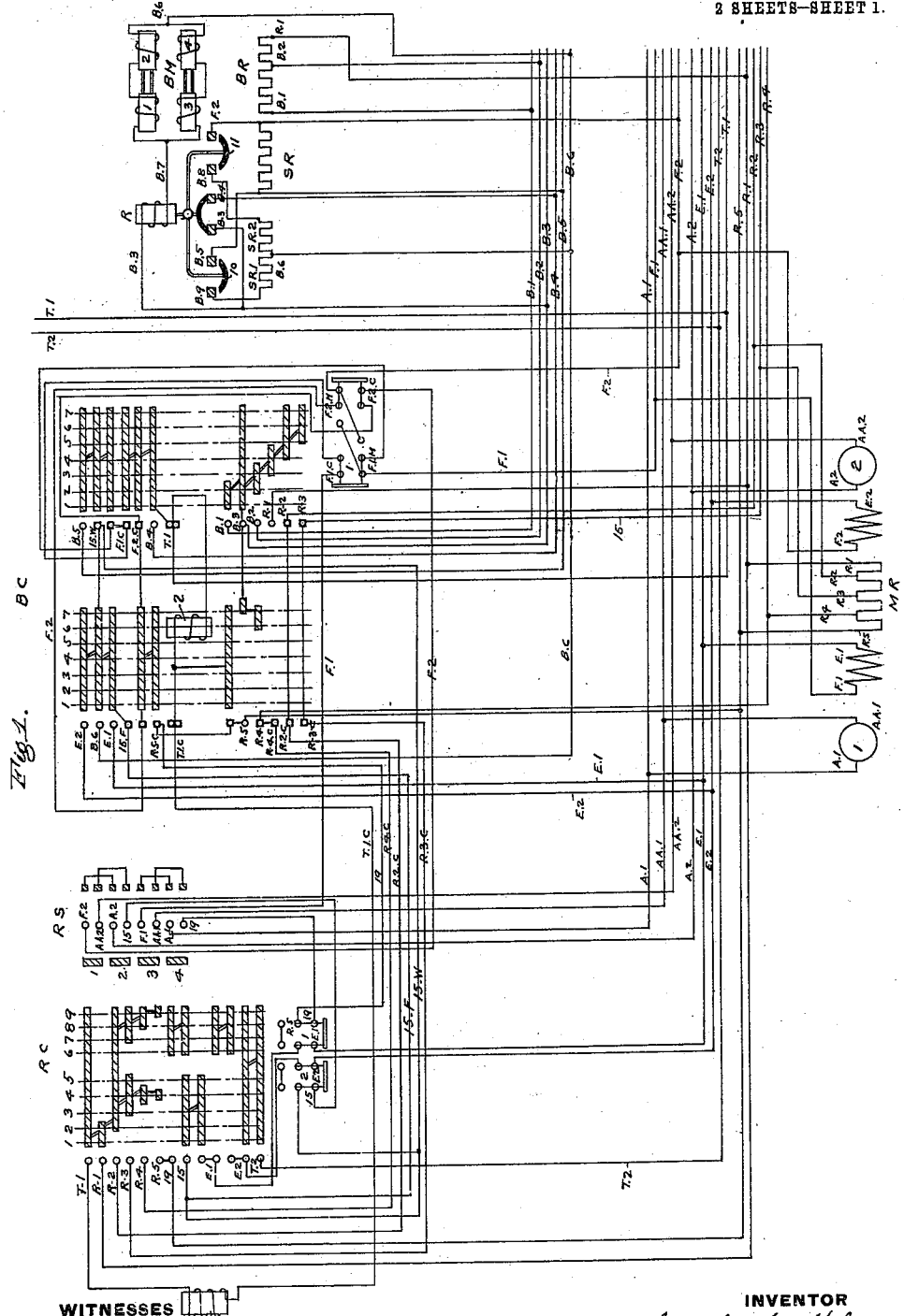
Figure 2:
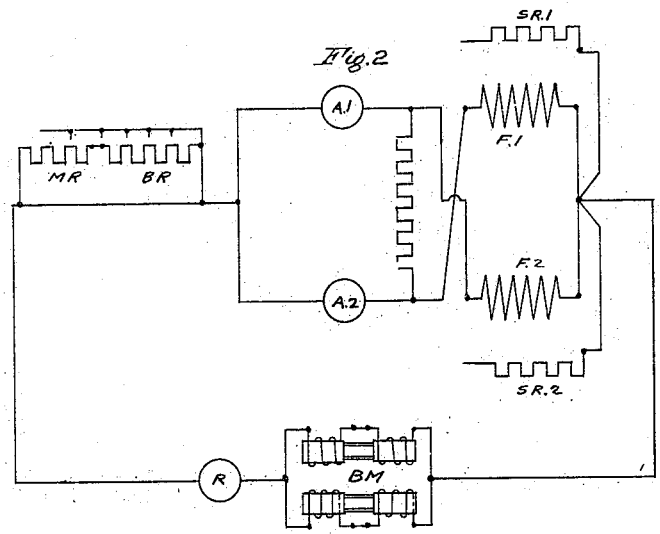
Figure 3:
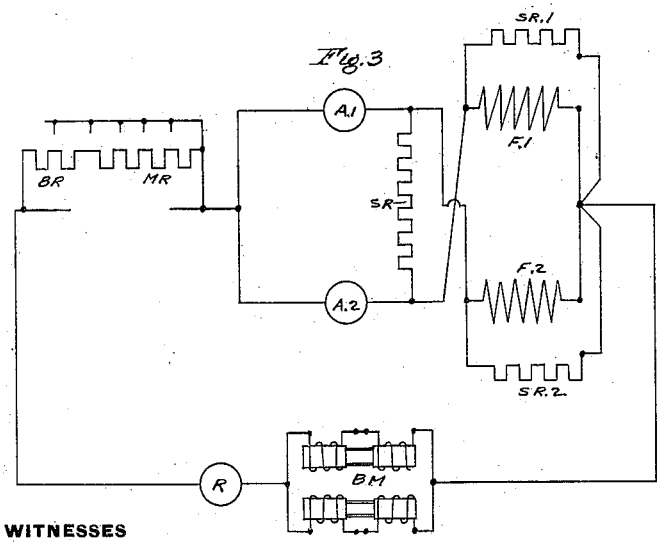

In the accompanying drawings; Figure 1 is a diagram illustrating a development of the wiring connections for a two motor car equipment, with my improvements applied thereto; Fig. 2 diagram illustrating the preliminary braking combination of circuits set up in the first braking position of the controller, and Fig. 3 a similar diagram of the final braking combination of circuits in said position.

The running controller RC may be of the usual standard series parallel type, having a reversing switch RS. The braking controller BC is preferably provided with two sets of connecting bars and two sets of fixed contacts placed 180° apart, one set of bars and contacts controlling the brake combinations in various positions, while the remaining contacts and connecting bars serve the purpose of the usual running and braking switch.

In the first running position of the running controller, the reverse switch being set in the forward position and the braking controller in the off position, the course of the current is from trolley $T^1$, lead $T^1$ through contacts and blowout coil 2 in the braking controller, thence to first bar of running controller RC and through lead $R^1$, main resistance MR, and lead $R^5$ to contacts $R^5$ and $R^{5c}$ in the braking controller, to lead 19 and contact 19 in RS, through bar 4 to lead $A^1$ and thence through the armature of motor No. 1 to lead $AA^1$, through bar 3 in the reversing switch RS to lead $F^1$ and through the field of motor No. 1 to lead $E^1$ and through bars in the running controller RC to lead 15, which continues through contacts in controller BC to point 15 in reversing switch RS and by the bar 2 through lead $A^2$ and armature of motor No. 2 to lead $AA^2$ and thence through bar 1 of reversing switch RS to lead $F^2$, through field of motor No. 2 to lead $E^2$ and by bars in the running controller to lead $T^2$ and trolley $T^2$. The movement of the running controller to further positions serves to vary the resistance and connect up the motors in parallel as will be readily understood.

In carrying out my invention I provide a magnet coil and switch for controlling a short circuit connection around the usual brake resistances, and I may utilize the regulating mechanism heretofore employed for controlling the cutting in and out of shunt resistances around the motor fields, by providing an additional switch adapted to be actuated upon energization of the regulator magnet.

The controller and the circuit connections, shown in the drawings, are adapted to produce braking combinations similar to those illustrated in my co-pending application, Serial No. 428,162, but it will be understood that my present invention may be generally applied in connection with various other braking combinations of circuits.

If it is desired to make an application of the brakes, the running controller being in the off position and the reverse switch in forward position, the braking controller is moved to the first braking position. The course of current flow will be traced as follows: from brush terminal $AA^1$ of motor No. 1 through lead $AA^1$ and bar 3 of reverse switch RS to lead $F^1$ and thence to point $F^{1c}$ in the braking controller BC, through connecting bars to point $F^{2c}$ and thence through lead $F^2$ to bar 1 in reverse switch, to lead $AA^2$ and armature of motor No. 2. Brush terminal $A^1$ of motor No. 1 is connected through lead $A^1$, connecting bar 4 in reverse switch RS, lead 19 and bars in the braking controller BC to lead $F^2$ and through the field winding of motor No. 2, while brush terminal $A^2$ of motor No. 2 is connected by lead $A^2$, through bar 2 in reverse switch RS with lead 15, and thence to point 15 in the running controller, from point 15 by lead $15^F$ to a connecting bar in the braking controller to lead $F^1$ and through the field coil of motor No. 1. As shown, the other terminals $E^2$ and $E^1$ of the field coils are connected by bars in the braking controller, thus completing the generator loop circuit, in which the field of each motor is supplied with current from the armature of the other motor. The motors are connected in parallel to supply current to the brake magnets, the normal braking circuit being completed through a common return wire in which the brake coils BM, the braking resistance BR, the main resistance MR, and the winding of the regulating device R is interposed. The regulating device R controls these switches, two of which are adapted to cut the shunt resistances $SR^1$ and $SR^2$ in and out, and the other switch controlling a short circuit around the braking and main resistances.

When the controller is first moved to braking position, the current flow is light, so that the regulating coil maintains the shunt switches open and the short circuiting switch closed, consequently the generator fields build up rapidly and a large flow of current is thereby momentarily sent through the brake circuit and the braking coils, which causes the rapid and positive movement of the brake shoes to the rails. As soon as the current flowing through the brake circuit and the regulating magnet coil has increased to a certain predetermined extent, the regulating coil operates the shunt switches to close the shunt circuits around the generator fields and open the short circuit around the braking resistances, the combination of circuits being as shown in the diagram, Fig. 3. The force of the brake application may now be gradually increased in the usual manner by moving the brake controller to its further positions in which more or less of the braking resistance is cut out, as will be readily understood. It will also be apparent that the initial momentary rush of current through the brake circuit is obtained in whatever position the braking controller may happen to be thrown. By this means the positive movement of the brake shoe to the friction engaging surface is assured, regardless of the clearance space or air gap to be overcome, while the motorman still retains control of the brake, and he may, therefore, graduate the force of application as desired so as to produce a smooth and easy stop.

Having now described my invention, what I claim as new and desire to secure by Letters Patent, is:

1. In a railway brake, the combination with motors adapted to act as generators and produce a flow of electric current in a local brake circuit, of means adapted to initially cause a rush of current through said brake circuit and then operating to restore the brake circuit to its normal braking condition.

2. In a railway brake, the combination with electric motors and a braking controller for connecting the motors to act as generators in a local brake circuit, of means governed by the current in said brake circuit for at first permitting a large flow of current through the brake circuit and then operating to restore said brake circuit to its normal braking condition.

3. In a railway brake, the combination with electric motors and a braking controller for connecting the motors to act as generators in a local brake circuit, of means adapted upon movement of the controller to a braking position, and governed according to the flow of current in said brake circuit, to first establish a direct circuit around a resistance to permit a large flow of current to the brake circuit and then operating to cut in said resistance and establish the normal braking combination.

4. In a railway brake, the combination with electric motors and a braking controller for connecting up said motors to act as generators to supply current to a local brake circuit, and a magnetic brake shoe normally having a clearance space between same and the friction engaging surface, of means for causing a sudden momentary rush of current through the brake circuit for bringing said brake shoe into engagement with said friction engaging surface.

5. In an electric brake apparatus, the combination with a plurality of motors adapted to act as generators in a local brake circuit, of a magnetic regulating device having its coil in the brake circuit and controlling a switch normally short circuiting a manually controlled resistance in said circuit and operating upon a predetermined increase in the flow of current through said brake circuit to open the short circuit and cut in the resistance.

6. In an electric brake apparatus, the combination with a plurality of motors adapted to act as generators in a local brake circuit, and a regulating device for controlling shunt resistances around the fields of the motors, of a switch operated by said regulating device for controlling a short circuit around a variable resistance in the brake circuit.

7. In an electric brake, the combination with a source of current for energizing a local brake circuit, and a magnetic brake shoe in said circuit, the magnetic attraction of which to a friction engaging surface effects the application of the brakes, said shoe being normally held at a distance from said friction surface, of means for momentarily energizing said brake magnet in applying the brakes, to bring said shoe into engagement with the friction engaging surface.

8. In an electric brake apparatus, the combination with a plurality of motors and a braking controller adapted to connect up said motors to act as generators for a local brake circuit, of a manually controlled resistance in said brake circuit, and means adapted, upon movement of the braking controller to a braking position, to temporarily short circuit said resistance.

9. In an electric brake apparatus, the combination with a magnetic brake shoe located in a local brake circuit, of means for causing a temporary initial rush of current to said brake shoe in applying the brakes.

10. In an electric brake apparatus, the combination with a magnetic brake shoe located in a local brake circuit, of a resistance adapted to be connected in said brake circuit, and means operating upon applying the brake for short-circuiting said resistance to cause an initial rush of current to said brake shoe.

11. In an electric brake apparatus, the combination with a magnetic brake shoe and a resistance adapted to be connected up in a local brake circuit, of two motors adapted to act as generators for supplying current to said brake circuit, shunt resistances adapted to be connected around the fields of said motors, and means operating upon applying the brakes for short circuiting the resistance in the local brake circuit and for opening the shunt resistance circuits around the motor fields.

12. In an electric brake apparatus, the combination with two motors adapted to be connected up to act as generators for a local brake circuit, of a brake magnet, a braking controller adapted to connect up said brake magnet and a resistance in the local brake circuit and shunt resistances around the fields of the motors, and means for short-circuiting the resistance in the local brake circuit and opening the shunt resistance circuits upon first moving the braking controller to a braking position and then operating to cut in the brake circuit and the shunt resistances.

13. In an electric brake apparatus, the combination with two motors adapted to be connected up to act as generators for a local brake circuit, of a brake magnet, a braking controller adapted to connect up said brake magnet and a resistance in the local brake circuit and shunt resistances around the fields of the motors, and a switch mechanism governed by the current in the local brake circuit and operating when the brakes are applied for initially short-circuiting the local brake circuit resistance and for opening the circuits of the shunt resistances and adapted upon a predetermined flow of current in the brake circuit to cut in the brake circuit resistance and close the circuits of the shunt resistances.

14. In an electric brake, the combination with a power and braking controller having one set of movable contacts for power and another set for braking, of means adapted to cause an initial rush of current through the brake circuit in the movement to a braking position and then operating to restore the brake circuit to its normal braking condition.

15. In an electric brake apparatus, the combination with two motors adapted to be connected up to act as generators in a local brake circuit and a power and braking controller having one set of movable contacts for power and another set for braking, of means operating in braking for maintaining the circuit of one motor upon failure of the other motor circuit.

In testimony whereof I have hereunto set my hand.

JOSEPH N. MAHONEY.

Witnesses:
R. F. EMERY,
WM. N. CADY.